Aug. 22, 1933.  A. A. WARNER  1,923,649
POWER TRANSMITTING MECHANISM
Filed Oct. 31, 1932
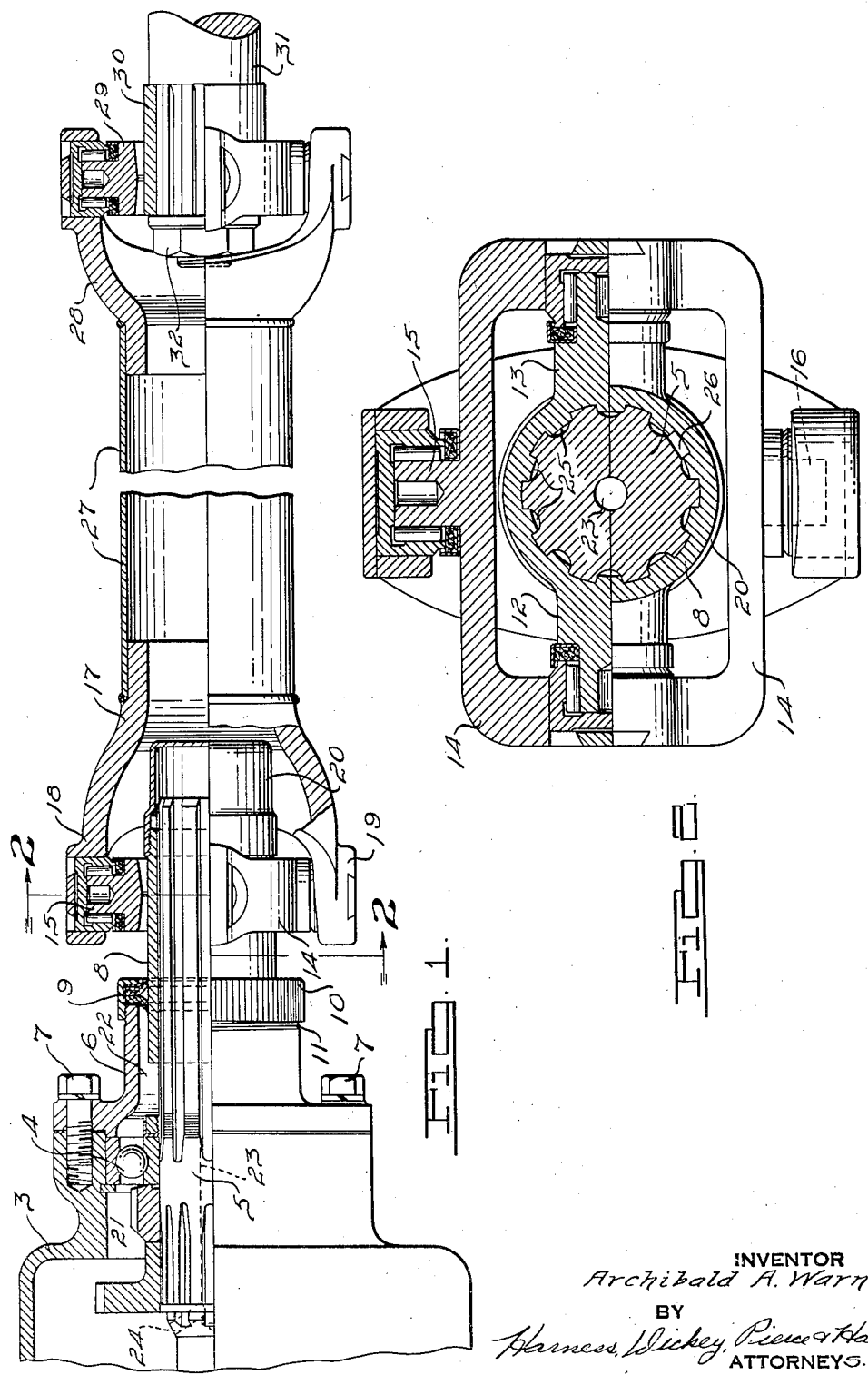
INVENTOR
Archibald A. Warner.
BY
Harness, Dickey, Pierce & Hann.
ATTORNEYS.

Patented Aug. 22, 1933

1,923,649

UNITED STATES PATENT OFFICE 1,923,649

POWER TRANSMITTING MECHANISM

Archibald A. Warner, Royal Oak, Mich., assignor to The Universal Products Co. Inc., a Corporation of Delaware Application October 31, 1932. Serial No. 640,431

6 Claims. (Cl. 64—102)

This invention relates to torque transmission lines suitable for motor vehicles and the like, and particularly for transmitting rotary motion at high-speed through universal joints, such as the propeller shaft of an automobile.

The main objects of this invention are to provide a construction in which a slip joint which compensates for difference in distance between a driving and driven member, is fully and adequately lubricated at all times by lubricant from a transmission case; to provide a construction in which the center line of the universal joint is positioned closely adjacent to the bearing of the shaft to which the joint is coupled, thereby securing a minimum of overhang; to provide a construction which will eliminate or reduce to a minimum the whipping of a propeller shaft, particularly at high speed such as four thousand to five thousand R. P. M.; to provide a construction which will permit the successful use of longer propeller shafts than heretofore possible; to provide a construction which will materially increase or prolong the life of the bearing which journals the rear end of the transmission shaft; to provide a construction which will effect an over all economical saving by eliminating the use of flanges and cap screws heretofore used and also the slip joint ordinarily used in a propeller shaft between the two universal joints.

An illustrative embodiment of this invention is shown in the accompanying drawing, in which:—

Fig. 1 is a view, partly in longitudinal section and partly in elevation, of the rear end of a transmission gear housing with the transmission shaft protruding therefrom, a propeller shaft splined thereto through the medium of a universal joint, and a universal joint at the other end of the propeller shaft connected to an axle pinion shaft.

Fig. 2 is a sectional view taken on the line 2—2 of Fig. 1, looking in the direction indicated by the arrows.

Heretofore in the construction of motor vehicles, such as automobiles, it has been customary to provide a two piece propeller shaft for connecting the transmission shaft to the axle pinion shaft, the two pieces of the propeller shaft being splined together and commonly known as a slip joint. Each end of the propeller shaft has ordinarily been provided with a universal joint, and the joints each having one member thereof terminating in a flange which is adapted to be bolted to a companion flange fixed to the respective adjacent ends of the transmission shaft and pinion shaft.

Such constructions have been extremely unsatisfactory under certain conditions, and the length of the propeller shaft using such a construction is quite definitely limited and thus has necessitated the use of two shafts and three universal joints in long wheel base constructions where the distance from the transmission case to the rear axle has been much over sixty inches.

Another objection has been the excessive whip of the shaft at high speeds, it being practically impossible to rotate such a shaft with spline connection at a speed in excess of twenty-five hundred to three thousand R. P. M.

Another objection has been the excessive strain and short life of the rear bearing on the transmission housing due to the amount of overhang, i. e. the space from the bearing to the center-line of the front universal joint, and the whipping action of the shaft.

Another problem involved in such prior art constructions which has been practically insurmountable is that of sufficient lubrication to the spline joint or slip connection. By reason of the exposed position of the spline connection, it is subjected to being covered with dirt, dust, mud and water, and even where lubrication is provided, it must be renewed at very short intervals. Neglect of replenishing the lubricant at this connection is very prevalent, by reason of its rather inaccessible location under the car, and, consequently, much trouble has been encountered.

In the present invention all of the foregoing problems have been effectively solved, adequate lubrication being supplied to the slip joint at all times from the transmission case. The amount of overhang or distance between the transmission shaft rear bearing and center-line of the adjacent universal joint has been reduced to the minimum; the propeller shaft adjoining the two universal joints is unitary in character thereby eliminating whip at high speed; the usual slip joint in the propeller shaft eliminated by use of the extended end of the transmission shaft, and an over all economical saving effected by eliminating the usual flanges and connecting cap screws.

In the construction shown in the drawing, a transmission gear housing 3 is shown provided with an anti-friction bearing 4 of the ball type in which is journaled the rear end of a transmission shaft 5. The shaft 5 extends rearwardly from the journal bearing 4, a distance greater than ordinary, and is provided with a series of splines in the usual manner, the splines extending from closely adjacent to the journal bearing to the end of the shaft.

In the particular construction shown, a separate housing member in the form of a collar 6 is secured by cap screws 7 to the rear end of the housing 3 in spaced relation to the splined end of the shaft 5.

An interiorly splined sleeve 8 is axially slidable on the splined end of the transmission shaft 5, and one end thereof normally extends within the collar 6 in overlapping telescopic relation, the space between the sleeve and collar housing being closed by an oil seal 9 which is held against the terminating rim of the collar 6 by a knurled ring 10 which is threaded on the exteriorly threaded end 11 of the collar 6.

A universal joint is carried on the axially slidable sleeve 8, with the center-line of the joint normally inward from the end of the transmission shaft 5, the sleeve 8 forming one member of the joint. A pair of diametrically opposed trunnions 12 and 13 are integrally formed on the sleeve 8 which extend radially with respect to the axis of rotation of the joint, and upon which is journaled an intermediate torque transmitting member 14 of generally rectangular shape. The member 14 is in turn provided with a pair of integrally formed diametrically opposed trunnions 15 and 16 which also extend radially with respect to the axis of rotation of the joint, the axis of this pair of trunnions being perpendicular to the axis of the trunnions 12 and 13.

A yoke member 17 having arms 18 and 19 is journaled on the trunnions 15 and 16 respectively, thus forming a four trunnion type of universal joint, the present construction illustrating trunnion bearings of anti-friction type, the details of which are not pertinent to this invention.

Means are provided for protecting and enclosing the end of the splined shaft 5 and comprise a cup or cap 20 threaded on the outer end of the sleeve 8 in spaced relation to the shaft end, thus permitting limited axial movement of the sleeve 8 inward from the position shown in Fig. 1, toward the transmission housing 3.

Lubricant from the transmission housing 3 may pass through the bearing 4 to the splines of the shaft 5 through the spaces 21 and 22, thus insuring a continuous and adequate supply at all times. Lubricant entrapped in the cap 20 may be vented therefrom by providing an axially disposed bore 23 in the shaft 5, the bore extending from the outer end of the shaft, inward to the interior of the transmission case where it joins a radially disposed, axially inclined bore 24. Entrapped lubricant may also be vented through the openings 25 which are normally present between the spline teeth of the sleeve 8 and the bottom of the spline grooves in the shaft 5. Another way in which this entrapped lubricant may be vented is by omitting one or more of the spline teeth, as at 26. Any or all of the foregoing means may be employed for preventing undesirable pressures in the space between the shaft end and cap, thus eliminating the possibility of rupturing the cap during inward movement of the sleeve 8, which movement compensates for difference in distance between the transmission shaft 5 and the rear axle of a motor car in other than torque tube drives, as is well known in the art.

The yoke 17 is welded, or otherwise suitably fixed to one end of a tubular propeller shaft, the other end of which is likewise welded to a yoke 28 of a universal joint of the same construction as hereinbefore described. As illustrated herein, the yoke 28 is journaled to an intermediate member 29, which, in turn, is journaled on the trunnions of a splined sleeve 30 which is fixedly secured on the end of an axle pinion shaft 31 by a nut 32, with the center line of joint inward from the end of the shaft, thus reducing the overhang, or distance to shaft bearing, to a minimum.

In the operation and use of this invention, the splined end of the transmission shaft 5 is slightly longer than that of the conventional construction and the sleeve 8 moves axially thereon to compensate for differences in distance to the driving axle as it moves relative to the chassis frame, thereby eliminating the usual slip joint of the two piece propeller shaft, and at the same time reducing the overhang, or distance between the joint center-line and the shaft bearing 4.

Lubricant is supplied to and circulated through the spline connection between the sleeve 8 and shaft 5, from the transmission housing at all times, thus securing adequate lubrication without frequent attention as at present.

By positioning the center-line of the joint carried by the sleeve 8, inward from the end of the shaft 5, there is no tendency to "cock" or bind as would be the case where the center-line is outward from the shaft end and the shaft 27 working at an angle with respect to the axis of the shaft 5, as in normal use in a motor car. When the shaft 27 is at an angle with respect to the axis of the transmission shaft 5, any forward thrust due to upward movement of the driving axle will be taken against the side of the spline shaft end as distinguished from a two point binding action which would be had if the joint centerline was beyond the end of the shaft.

Movement of the sleeve 8 creates a pumping action in the space between the outer end of the shaft 5 and the cap 20, which causes a forced circulation of lubricant in the splined connection which is highly desirable.

Although but one specific embodiment of this invention has been herein shown and described, it will be understood that numerous details of the construction shown may be altered or omitted without departing from the spirit of this invention as defined by the following claims.

I claim:

1. The combination of a housing, a driving shaft protruding from said housing, a sleeve axially slidable and non-rotatably mounted on said protruding end, an oil seal closing the space between said sleeve and housing, and a universal joint carried on said sleeve with the center line of said joint inward from the end of said shaft.

2. The combination of a housing, a driving shaft protruding from said housing, a sleeve axially slidable and non-rotatably mounted on said protruding end, an oil seal closing the space between said sleeve and housing, a closure for the outer end of said sleeve in spaced relation to the end of said shaft, means providing lubricant communication between said housing and the space between the shaft and end closure, and a universal joint carried on said sleeve.

3. The combination of a transmission housing, a driving shaft journaled in said housing with an end projecting therefrom, said projecting shaft end being splined, a splined sleeve axially slidable on said shaft end, an oil seal closing the space between said sleeve and housing, and a universal joint mounted on said sleeve between the end of said shaft and said shaft journal bearing.

4. The combination of a driving shaft, a driven shaft, a universal joint fixed on one of said shafts, a second universal joint slidable on the other of said shafts, with the center line of the joint inward from the end of such shaft, and a unitary propeller shaft joining said universal joints.

5. A power transmission for motor vehicles comprising a transmission housing, a bearing mounted on the housing, a driving shaft rotatably journaled in the bearing and extending into the housing and having a portion projecting from the housing, a universal joint slidably but non-rotatably mounted on the projecting portion of the shaft substantially adjacent the bearing so as to limit overhang of the shaft to a minimum, a second shaft for connection with the axle of the vehicle, a universal joint connected to said second shaft, and a unitary torque shaft connecting the universal joints, the first universal joint having its center line within the length of the first and driving shaft, whereby binding tendencies in the slidable connection will substantially be avoided when the torque shaft is angled with respect to the driving shaft.

6. A power transmission for motor vehicles comprising a transmission housing, a bearing mounted on the housing, a driving shaft rotatably journaled in the bearing and extending into the housing and having a portion projecting from the housing, a driven shaft for connection with an axle of the vehicle, a universal joint slidably but non-rotatably mounted on the projecting portion of the driving shaft with its center line within the length of said shaft, a universal joint mounted on the second shaft, and a unitary torque shaft connecting the two universal joints.

ARCHIBALD A. WARNER.